3,460,559
COMBINED PRESSURE REGULATOR AND RELIEF VALVE

Cecil V. Pullen, Utica, and Frederick A. Kaiser, Clinton, N.Y., assignors to The Bendix Corporation, a corporation of Delaware
Continuation-in-part of application Ser. No. 599,909, Dec. 7, 1966. This application Aug. 26, 1968, Ser. No. 767,883
Int. Cl. G05d 11/00
U.S. Cl. 137—116.5                                          5 Claims

ABSTRACT OF THE DISCLOSURE

A fluid valve having combined pressure regulation and overpressure relief functions. A relief valve comprising mutually-movable members is interposed between a reference spring and the control diaphragm of a pressure regulator valve. The spring biases the members together to form a closed chamber which communicates via a passage through the diaphragm with the low pressure side of the valve. When pressure downstream of the valve exceeds its predetermined value by a known, fixed percentage, the members separate to provide a flow path between the downstream side of the valve and a fluid dump.

---

This application is a continuation-in-part of our commonly-assigned, copending application Ser. No. 599,909, "Combined Pressure Regulator and Relief Valve," filed Dec. 7, 1966, now abandoned.

Often, fluid systems requiring accurate control or which involve structurally fragile elements, will require both fluid regulation and relief means which are normally separate valve devices. The present invention comprises a combined valve for both functions which not only achieves cost reducing commonization of parts, but also establishes a known relationship between regulation and relief pressure valves so that they are easier to set, and are resistant to many commonly-occurring mis-setting abuses.

Figure 1:
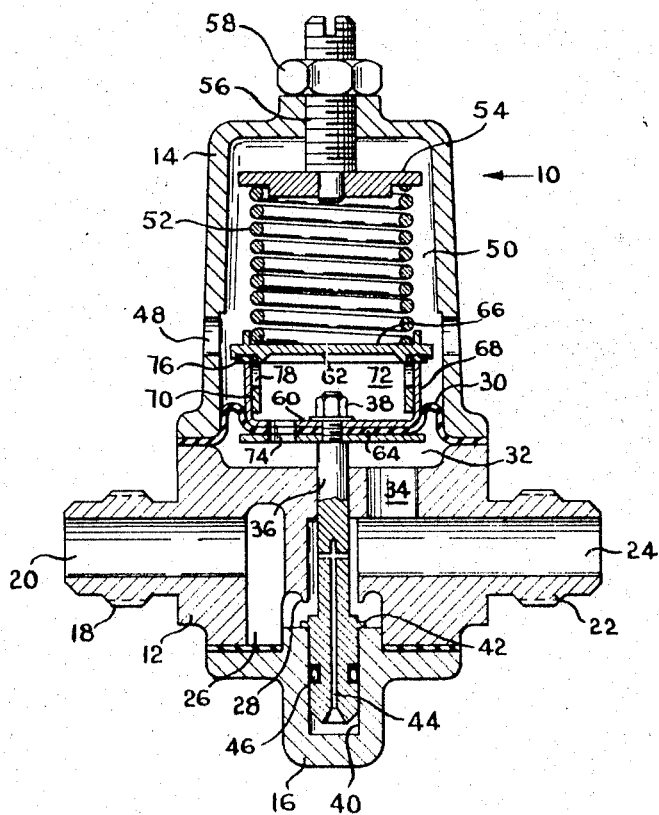
FIGURE 1 shows in section, a preferred embodiment of our combined regulator and relief valve.

Referring to FIGURE 1 of the drawing, our valve assembly, generally designated by numeral 10, is comprised of three body parts. A main or intermediate body portion 12, an upper body portion 14, and a lower body portion 16 are connected together in a sandwich arrangement. An inlet fitting 18 and a fluid inlet passage 20 are formed in one side of the main body portion, and an outlet fitting 22 and outlet passage 24 formed in the other side. A central chamber 26 interconnects the inlet and outlet passage in series through a circular valve seat 28.

A control diaphragm or movable wall member 30 is clamped at its periphery between he main and upper body portions, and forms a chamber 32 with the main housing which is connected via branch passage 34 to outlet passage 24. An axially-reciprocating valve rod 36 is secured by nut 38 to the central portion of diaphragm 30, and extends through the main body 12 and into pilot bore 40 formed in lower body portion 16. A stepped regulating valve 42 is formed on valve rod 36 in proximity to valve seat 28. Passage means 44 is formed in rod 36 to transmit outlet pressure to the end of rod 36 in bore 40 for fluid balancing purposes as is well-known. Peripheral seal 46 on rod 36 prevents leakage of high pressure inlet fluid to the rod end.

The upper housing portion 14 is vented by ports 48, and defines an interior space 50 in which there is an adjustable reference spring 52 confined at one end by spring retainer 54, which is piloted on adjustable screw 56 which extends externally of the housing. Screw 56 may be conveniently adjusted and locked in position by jam nut 58.

Interposed between spring 52 and control diaphragm 30 are a pair of mutually-movable cup-shaped members 60 and 62, each having end walls 64 and 66 and annular sidewalls 68 and 70, and an open end. The mutually-movable cup-shaped members 60 and 62 are arranged in telescoping relationship to define an interior chamber 72 which receives outlet pressure via port 74 passing through the diaphragm to chamber 32. A circular seal, or gasket 76, is attached to the lower side of the peripheral edge of member 62 where it cooperates with the upper edge of annular sidewall 68 to normally seal chamber 72. A series of circumferentially-arranged relief valve ports 78 are formed in the annular sidewall 70.

In this embodiment, the endwalls 64 and 66 and annular sidewalls 68 and 70 cooperate to define a chamber 72 having known internal surface areas and which establishes a mechanical connection between the spring 52 and the rod 36. The sidewalls further cooperate to provide a guide means for the mutual movement of members 60 and 62. Thus, once having separated to provide overpressure relief, the members 60 and 62 can again be brought into properly-abutting relationship by spring 52 when the malfunction which created the overpressure has been corrected. By properly-abutting relationship is meant the contact between annular sidewall 68 and seal 76.

High pressure inlet fluid which may be variable in pressure over a considerable range is adapted to be supplied to inlet passage 20 and flows through central chamber 26, valve seat 28, and into outlet passage 24. Valve seat 28 and valve 44 define a flow restricting area operative to reduce pressure from a high inlet valve to desired regulated outlet pressure valve. Outlet pressure is communicated to the lower face of control diaphragm 30 wherein it applies a force tending to move valve 44 towards seat 28 in a flow restricting direction. The valve opening force is applied by reference spring 52, and to a lesser extent the air pressure in space 50. Cup-shaped members 60 and 62 are normally in a solid abutting relationship wherein they are operative to transmit the force of spring 52 directly to the control diaphragm. When regulating forces on the movable assembly, comprising the control diaphragm and valve rod, are in balance, the outlet pressure is regulated to a selected value established by the adjustment of spring 52. If due to some disturbance, outlet pressure should tend to increase beyond the regulated value, pressure in chamber 32 will momentarily increase, moving the control diaphragm upwardly and valve 44 in a closing direction, restoring regulated pressure to the selected value. A drop in regulated pressure results in valve 44 seeking a more open position to restore the desired value.

Should a system failure occur either in a downstream controlled system or in the regulator valve causing outlet regulated pressure to exceed its selected regulated value by a predetermined percentage, cup-shaped members 60 and 62 will telescope outwardly, opening relief ports 78 to provide overpressure relief. The pressure on opposed sides of lower cup-shaped member 60 is essentially balanced at all times, and port 74 is made relatively large for this purpose. The relief valve is actuated by pressure acting on the lower face of end wall 66 which is opposed by the preload of spring. By design selection of the surface area of the endwall of the cup-shaped member, the diaphragm area and the spring rate of spring 52, a desired proportionate relationship is established between regulated pressure and relief pressure valve. For example, a valve may be designed so that overpressure relief pressure is 10% greater than regulated pressure. If, by adjustment of spring 52, a regulated pressure of 20 p.s.i. is established, then overpressure relief will occur at 22 p.s.i. If the selected regulated pressure is increased to 50 p.s.i. by adjusting spring 52, overpressure relief will occur at 55 p.s.i. Thus, a known relationship will always exist between regulated and relief pressure valves. This relationship protects against setting abuses, when two separate valves are utilized, and obviates the need for disconnecting the valve from a delicate system to check relief valve setting.

Figure 2:
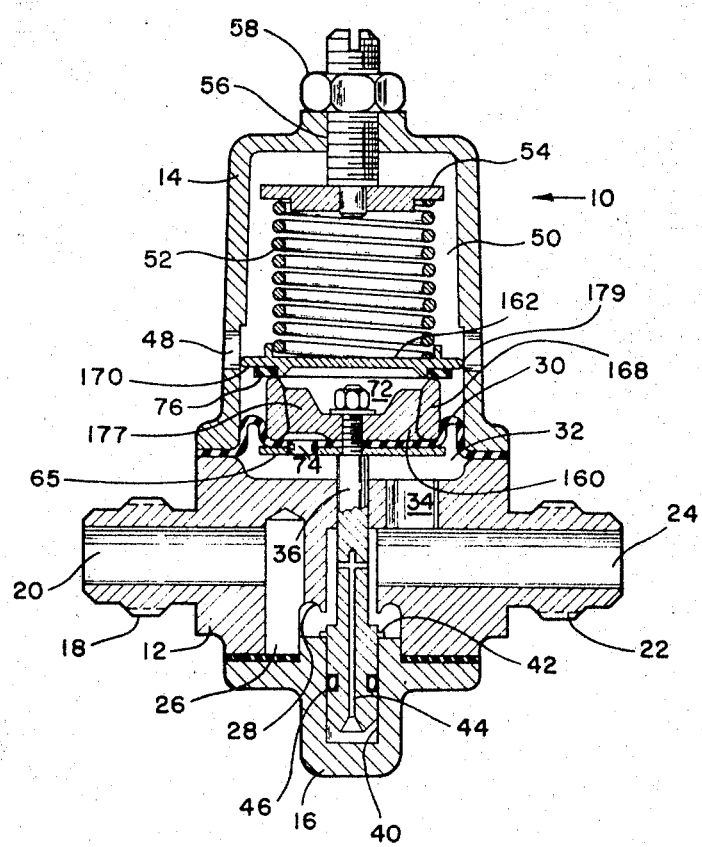
FIGURE 2 shows in section, an alternative embodiment of our valve showing a modification of the mutually-movable members.

Referring now to FIGURE 2, the combined pressure regulator and relief valve is shown with most component parts identical to those shown in FIGURE 1. These identical components bear the same numerals as were used in FIGURE 1. The variation in this embodiment is in the mutually-movable members 160 and 162. The upper member 162 does not have an annular sidewall structure as shown by 70 in FIGURE 1, but has in its place an extended lip 170 which is in sliding contact with the interior wall of the upper housing member 14 as shown at 179. The lower member 160 retains an annular circumferential portion as shown at 168, and is connected to the valve rod 36 by webs 177. Washer 65 provides for a pressure tight connection at the valve rod 36 and also maintains the diaphragm member 30 in close contact with the lower movable member 160. The washer 65, upper movable member 162 and lower movable member 160 cooperate to define a chamber 72, the interior of which is exposed to outlet pressure through passage 34 and port 74. This chamber 72 is normally closed, but may open to communicate outlet passage pressure through the port 48 to the region external of the valve assembly 10 by fluid pressure moving upper member 162 and seal 76 away from the lower member 160 and annular wall 168.

The lip 170 and the interior wall of the upper housing portion 14 cooperate to perform the guiding function which was performed in the FIGURE 1 embodiment by the telescoping walls 68 and 70. This embodiment relies upon the gap created between the upper edge of annular portion 168 and seal 76 upon movement of member 162 away from member 160 to provide overpressure relief. This embodiment has the advantage that the flow path created by the gap can be much greater than that created by the ports 78 in the FIGURE 1 embodiment, thereby accommodating greater pressure differential and fluid flows.

By providing pressure regulation and overpressure relief through the same spring, the valve becomes easier to set and the overpressure relief becomes a constant percentage independent of the pressure regulated, but dependent on the ratio of the areas of the regulating valve and the relief valve.

We claim:
1. A combined pressure regulating and overpressure relief valve comprising:
a valve housing having a fluid controlling valve seat disposed therein;
fluid inlet and fluid outlet passages adapted to transmit inlet fluid to and outlet fluid away from said valve seat;
a movable regulating valve member disposed in said housing in fluid controlling relationship with said valve seat;
reference spring means operative to apply a valve opening force to said movable regulating valve;
chamber means interposed between said spring means and said movable regulating valve member operative to provide a mechanical connection therebetween;
movable wall means responsive to applied forces and connected to said chamber means to establish the fluid controlling position of said movable regulating valve member;
means interconnecting said outlet passage and said movable wall means to apply a fluid pressure force representative of outlet fluid pressure, urging said movable regulating valve member in a closing direction thereby regulating the outlet pressure;
port means formed in said chamber means operative to transmit fluid outlet pressure to the interior of said chamber means; and
normally closed relief valve means formed in said chamber means and operative to open against the bias of said spring means in response to excessive outlet pressure.

2. A combined pressure regulating and relief valve as claimed in claim 1 wherein:
said chamber means is comprised of a member having an annular sidewall and a co-acting planar member; and
said relief valve opening means is comprised of the abutment edge of said annular sidewall and a seal contained in said planar member.

3. A combined pressure regulating and relief valve as claimed in claim 1 wherein:
said chamber means is comprised of a pair of cup-shaped members each having an endwall, sidewalls, and an open end; said pair of cup-shaped members arranged in telescoping relationship to define an enclosed interior chamber receiving outlet pressure.

4. A combined pressure regulating and relief valve as claimed in claim 3 wherein:
said pair of cup-shaped members normally held in solid abutting contact operative to define a force transferring connection.

5. A combined pressure regulating and relief valve as claimed in claim 4 including:
seal means secured to one of said pair of cup-shaped members and in sealing contact with the sidewalls of the other of said pair of cup-shaped members.

References Cited

UNITED STATES PATENTS

| | | | |
|---|---|---|---|
| 2,089,144 | 8/1937 | Work | 137—116.5 |
| 2,150,460 | 3/1939 | Riches | 137—116.5 |
| 2,664,674 | 1/1954 | Niesemann | 137—116.5 |
| 2,707,966 | 5/1955 | Taplin | 137—116.5 |
| 2,747,599 | 5/1956 | Watson | 137—116.5 |
| 2,761,464 | 9/1956 | Faust | 137—116.5 |
| 2,806,481 | 9/1957 | Faust | 137—116.5 |
| 2,831,494 | 4/1958 | Taplin | 137—116.5 |
| 2,879,783 | 3/1959 | Taplin | 137—116.5 |
| 2,894,526 | 7/1959 | Booth et al. | 137—116.5 |
| 3,221,762 | 12/1965 | Chinn | 137—116.5 |

FOREIGN PATENTS 615,323   2/1961   Canada.

JOHN PETRAKES, Primary Examiner